(12) United States Patent
Hoffmann et al.

(10) Patent No.: US 7,614,644 B2
(45) Date of Patent: Nov. 10, 2009

(54) HOUSING FOR RECEIVING A MOTOR VEHICLE AIRBAG MODULE

(75) Inventors: Sven Hoffmann, Dachau (DE); Roland Peiz, Hilgertshausen (DE); Joachim Kurth, München (DE); Thomas Niedernhuber, Gilching (DE)

(73) Assignee: Autoliv Development AB, Vargarda (SE)

( * ) Notice: Subject to any disclaimer, the term of this patent is extended or adjusted under 35 U.S.C. 154(b) by 220 days.

(21) Appl. No.: 10/576,409

(22) PCT Filed: Oct. 21, 2004

(86) PCT No.: PCT/EP2004/011909

§ 371 (c)(1),
(2), (4) Date: Feb. 19, 2007

(87) PCT Pub. No.: WO2005/039937

PCT Pub. Date: May 6, 2005

(65) Prior Publication Data

US 2007/0290491 A1    Dec. 20, 2007

(30) Foreign Application Priority Data

Oct. 22, 2003    (DE) ................................. 103 49 520

(51) Int. Cl.
*B60R 21/205* (2006.01)
*B60R 21/217* (2006.01)

(52) U.S. Cl. .................................... 280/728.2; 280/732
(58) Field of Classification Search ............... 280/728.2, 280/728.3, 732, 752
See application file for complete search history.

(56) References Cited

U.S. PATENT DOCUMENTS

| | | | | |
|---|---|---|---|---|
| 4,943,027 A | * | 7/1990 | Nakayama | 248/548 |
| 5,295,707 A | * | 3/1994 | Satoh et al. | 280/728.2 |
| 5,342,082 A | | 8/1994 | Kriska et al. | |
| 5,356,178 A | * | 10/1994 | Numata | 280/777 |
| 5,395,133 A | | 3/1995 | Lauritzen et al. | |
| 5,405,163 A | | 4/1995 | Amamori et al. | |
| 5,503,427 A | * | 4/1996 | Ravenberg et al. | 280/728.3 |
| 5,505,484 A | * | 4/1996 | Miles et al. | 280/728.2 |
| 5,533,747 A | | 7/1996 | Rose | |
| 5,775,723 A | | 7/1998 | Dede et al. | |
| 5,791,684 A | * | 8/1998 | Repp et al. | 280/732 |
| 5,826,901 A | * | 10/1998 | Adomeit | 280/728.2 |
| 5,887,891 A | | 3/1999 | Taquchi et al. | |
| 6,010,147 A | * | 1/2000 | Brown | 280/728.2 |

(Continued)

FOREIGN PATENT DOCUMENTS

DE    202 14 954 U1    2/2003

(Continued)

*Primary Examiner*—Paul N Dickson
*Assistant Examiner*—Laura Freedman
(74) *Attorney, Agent, or Firm*—Harness, Dickey & Pierce, PLC

(57) ABSTRACT

A housing for acceptance of an airbag module for a motor vehicle includes at least two side walls located opposite one another formed to be capable of deformation to different extents. The side walls are more easily capable of deformation and exhibit a generally flat area section which can be deformed in the direction of the housing floor if acted upon by force, and which remain stable in shape in the case of tensile force applied in a direction generally away from the housing floor.

20 Claims, 2 Drawing Sheets

U.S. PATENT DOCUMENTS

Figure 1:
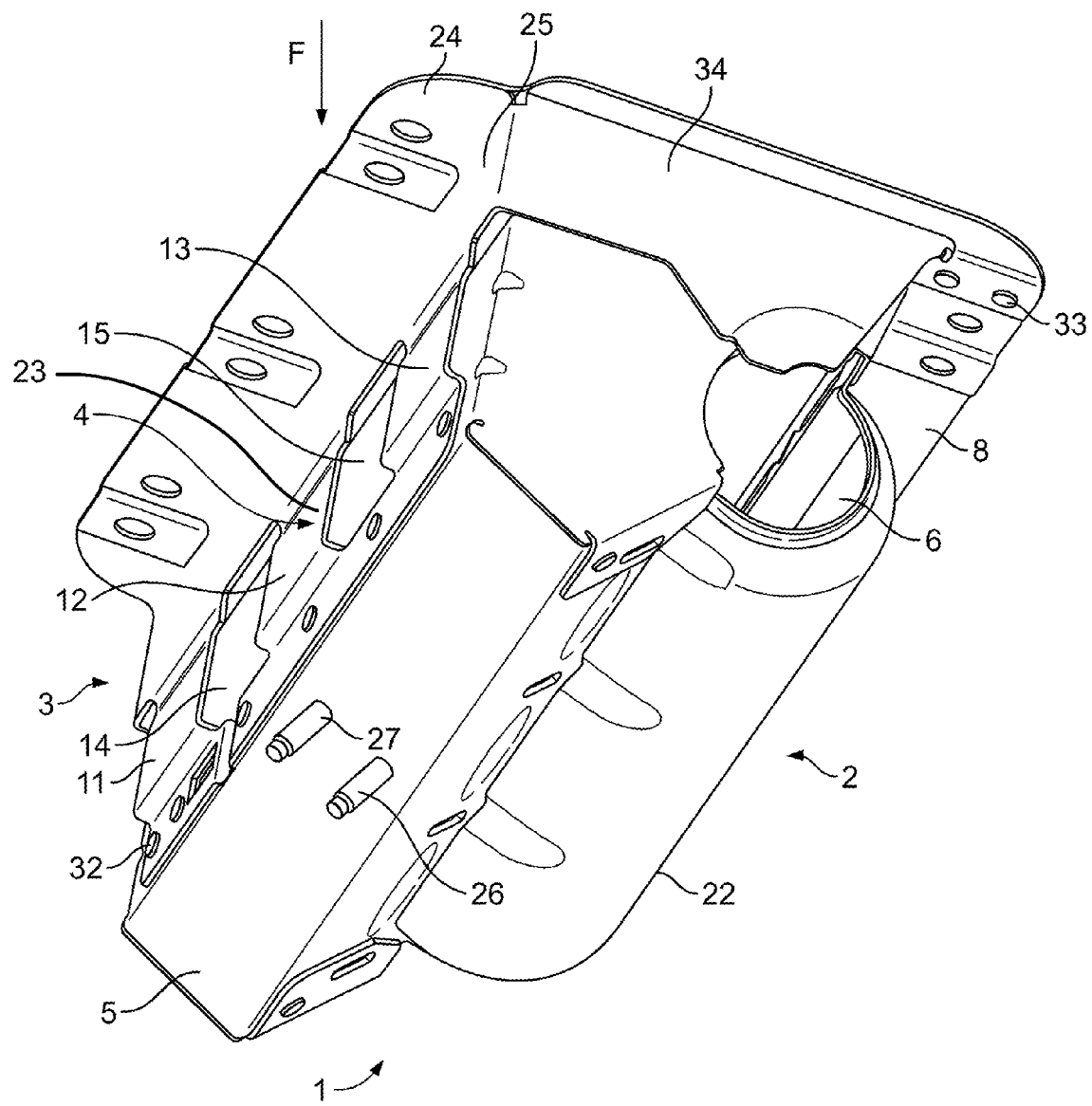

| | | | |
|---|---|---|---|
| 6,135,495 A * | 10/2000 | Redgrave et al. | 280/732 |
| 6,176,511 B1 * | 1/2001 | Adkisson et al. | 280/728.2 |
| 6,279,942 B1 * | 8/2001 | Bossenmaier et al. | 280/728.2 |
| 6,422,600 B1 | 7/2002 | Crohn et al. | |
| 6,877,766 B2 * | 4/2005 | Mikolajewski | 280/728.2 |
| 2001/0002749 A1 | 6/2001 | Usami et al. | |
| 2004/0061314 A1 | 4/2004 | Keutz et al. | |

FOREIGN PATENT DOCUMENTS

| | | |
|---|---|---|
| EP | 0 734 914 A1 | 10/1996 |
| EP | 0 818 361 A1 | 1/1998 |
| GB | 2 271 532 A | 4/1994 |
| GB | 2 332 177 A | 6/1999 |
| JP | 2001-270412 A | 10/2001 |

* cited by examiner

HOUSING FOR RECEIVING A MOTOR VEHICLE AIRBAG MODULE

CROSS-REFERENCE TO RELATED APPLICATIONS

This application is a National Stage of International Application No. PCT/EP2004/011909, filed on 24 Oct. 2004. The entire disclosure of the above application is incorporated herein by reference.

FIELD

The invention relates to a housing for acceptance of a vehicle airbag module according to the introductory section of Claim 1.

BACKGROUND

Such a housing is known for example, from U.S. Pat. No. 5,342,082. This housing is provided with side walls and a section for accommodation of a gas generator by means of which an airbag is inflated if an accident occurs to the vehicle which requires retention of the passengers. An interior cladding element such as, for example, a cover hood can be attached at the end of the housing away from the gas generator.

Such retention devices are normally designed in such a way that the gas generator is only activated in order to inflate the airbag when a predetermined seriousness of accident is sensed. For this reason there is a need to design this retention device in an advantageous manner also for such cases of retention which occur with relatively low vehicle deceleration. To this end it is proposed in U.S. Pat. No. 5,342,082 that at least one of the side walls of the airbag module housing exhibits a deformation section, in which the side wall material is formed in waves. By means of this measure it is achieved that when the head of a vehicle occupant strikes the cover hood of the airbag module, this side wall yields mechanically and therefore a part of the impact energy is transformed into deformation work.

However, it is considered to be disadvantageous that if there is a pull force on the interior cladding element fixed to the side wall of this airbag module housing, the one or several deformation sections also yield mechanically, which leads to elongation of the side walls which is not desired. Such a case occurs, for example, when the interior cladding element is formed as a constituent part of the instrument panel of a motor vehicle, to which a vehicle occupant holds fast when entering or leaving the vehicle.

The holder for an interior cladding element of a motor vehicle described in DE 101 08 685 C1 attempts to overcome this defect, and also serves to accommodate an airbag module. For this purpose, pre-formed set buckling areas are formed on two opposite side walls, which consist of surface sections which project sideways from the surface of the relevant side walls. These surface sections continue to be deformed in the case of a collision with the holder or with the interior cladding element in such a way that the holder is pressed together basically parallel to the force which is taking effect.

In order to be able to resist pull force on the interior cladding element or the interior cladding element which is fixed to it without deformation of the holder, hooks are formed on the two side walls which exhibit set kinks. These hooks bridge over these set kink areas in such a way that the side walls can be pushed together as described when subjected to pressure loads on the holder and on the other hand, when there is a pull force the hooks hook into allocated openings and therefore prevent the set kink areas which are already present from pulling together.

A disadvantage of this holder is its relatively complex structure, which makes manufacture expensive and difficult.

The task of the invention is therefore to present a housing for acceptance of an airbag module of the generic type which can be manufactured at low cost because of its structure and on the one hand yields mechanically if the housing or an inner cladding element is affected by force, as well as on the other hand resists pull forces without deformation of the side walls.

SUMMARY

The solution to this task results from the characteristics of the main claim, while advantageous further forms and versions of the invention can be taken from the sub-claims.

Accordingly, the invention starts from a housing for acceptance of an airbag module for a motor vehicle in which at least two side walls lying opposite each other are designed so as to be capable of deformation to different extents. In order to fulfill the set task, it is now additionally provided that the side wall which deforms more easily exhibits a basically flat surface section, which can be deformed in the direction of the housing floor if force is applied, and whose form remains stable if pull force is applied basically in a direction away from the housing floor.

Deviating from the state of the art, in this housing advantageously no further aid such as a hook is required in order to keep the side wall which can be deformed in the opposite direction stable as regards its form when force is applied in the direction of the housing floor.

A particular embodiment of the invention provides that an acceptance area for a gas generator is integrated into the side wall which can be deformed less easily. This integration succeeds particularly by means of a corresponding convexity of the side wall which is less easily deformed.

In addition it is a component of the invention that the less easily deformable side wall of the housing exhibits a rotation or bending section, round which an interior cladding element fixed there swivels or is bent round in case of deformation of the side wall which is deformed more easily.

With regard to the form of the deformation section of the side wall which is deformed more easily, deformation elements are preferably arranged or formed which lead to targeted weakening of the mechanical stability of this side wall.

Material bridges are preferably used as deformation elements which are arranged next to cut-outs in the side wall which is deformed more easily. These cut-outs can be in the form of holes or individual corrugation.

A further advantageous embodiment of the invention provides that the cut-outs and/or the deformation bridges are formed in the side wall which is deformed more easily in such a way that they cause a pre-set deformation path, as well as a pre-set final deformation geometry. In addition, it can also be provided that certain deformation structures are embossed into the deformation bridges.

In any case, in the structure of the housing according to the invention it is intended that the stability of the more easily deformed side wall is calculated in such a way through the selection and arrangement of the cut-outs and bridges that the wall only yields mechanically following application of a pre-set force.

A further independent aspect of the invention is the integration of the injection channel of the airbag module into the housing. Within this it is particularly provided that the injection channel for unfolding of the airbag of the airbag module is integrated in the housing in such a way that an injection channel wall is formed by the side wall which is deformed more easily.

As a further development of the invention, it can also be provided for that the side wall which is deformed more easily is formed in several parts, whereby a first side wall part is connected with the housing floor, the acceptance area for the gas generator and also the rotation or bent section in one piece, while the other side wall part is formed by the deformation bridges fixed onto the first side wall part.

In addition, it is advantageous if the free ends of the deformation bridges form a flange area for fixing one side of the interior cladding element.

With regard to the deformation bridges it should still be mentioned that advantageously these are arranged and formed in such a way that when in undeformed state they maintain a distance to the first side wall part and when deformation occurs they are supported on this first side wall part basically crosswise to the direction of the deformation force.

Another further development of the invention provides that the housing is formed in two parts, whereby a first side housing part forms at least a part of the side wall which deforms more easily, the housing floor, the acceptance area for the airbag module as well as a flange area with the rotation section, while a second side housing part comprises the deformation bridges and cut-outs, an upper section of the injection channel and the other flange area for fixing of an interior cladding element. Within this context the injection channel is basically formed by the second side housing part.

Another variant of the housing formed according to the invention provides that a support element is formed in one piece on the underside of the first side housing part or is fixed to this by means of fixing means.

However, the housing can itself be designed as an airbag module, in which the gas generator, the airbag, the deformation means and the injection channel for the airbag area are accommodated and the flange areas for fixing of the interior cladding element are arranged or formed.

For securing the folded airbag during transport within the housing which is in itself open and formed as an airbag module, the open housing side is preferably covered with a foil.

Finally, attention should be drawn to the fact that this housing or airbag module is preferably in the form of a passenger airbag.

DRAWINGS

Figure 2:
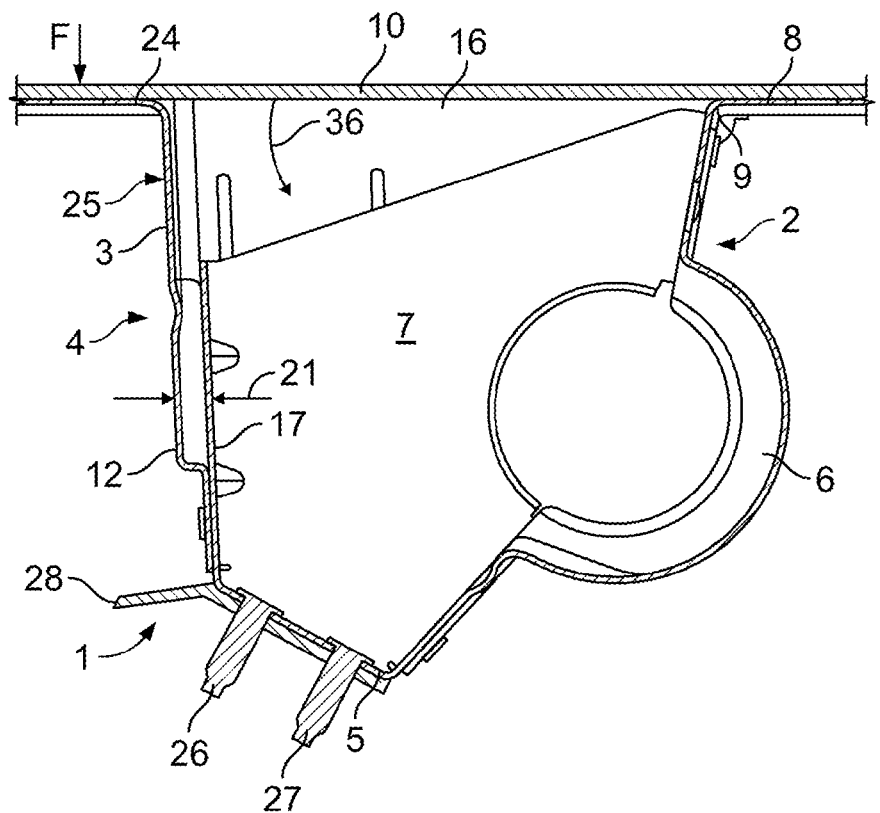
Figure 3:
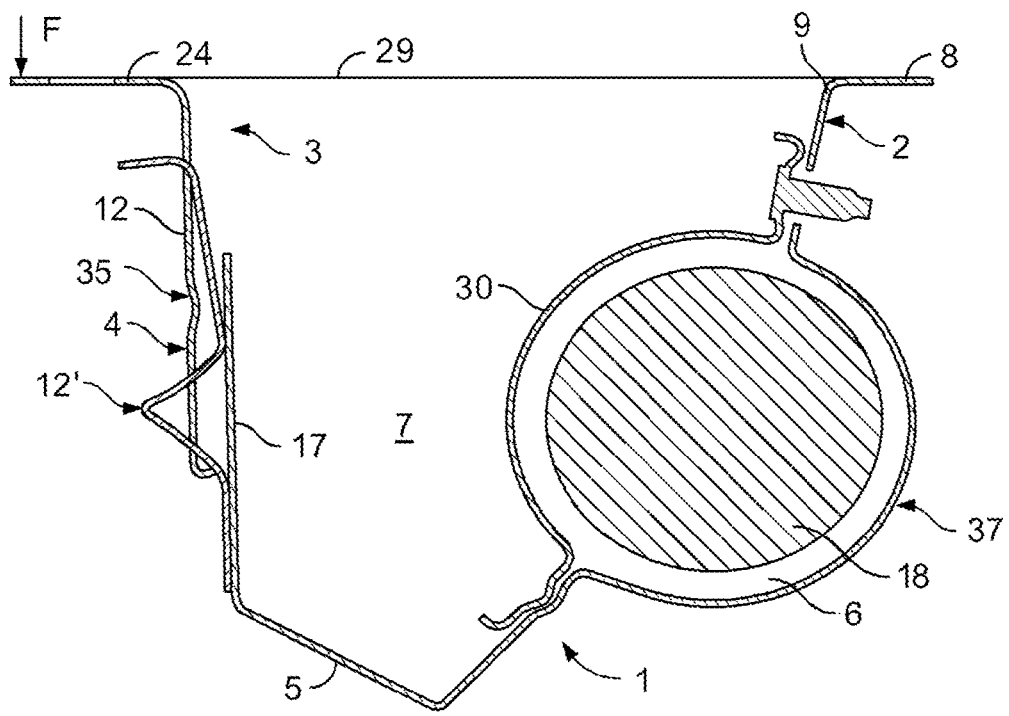

The invention is described in more detail below with the help of an embodiment shown in schematic form in the drawings. These drawings are as follows:

FIG. 1 is an illustration of a housing formed according to the invention for acceptance of an airbag module, FIG. 2 is a cross-section through the housing according to FIG. 1 in non-deformed condition in the area of the stay bolts on the housing floor, and FIG. 3 is a cross-section as in FIG. 2, however following deformation of the housing.

DETAILED DESCRIPTION

According to this, FIG. 1 shows a three-dimensional view of a housing 1 formed in accordance with the teachings of the present disclosure. The housing 1 is suitable for acceptance of an airbag module or is itself formed as such. Within this, housing 1 is, so to speak, shown from its rear side, in other words from the side which points towards a body structure of the motor vehicle (not shown). For fixing onto this vehicle body structure, two fixing means in the form of stay bolts 26, 27 are attached to a housing floor 5 of the housing 1. A support element 28, as shown in FIG. 2, can also be attached to these stay bolts 26, 27, which on its side is attached to a vehicle body part (not shown).

As can clearly be seen in this FIG. 1, this housing 1 advantageously consists of only two side housing parts 22 and 23, which are each preferably stamped out and formed of one metal piece. The two side housing parts 22, 23 are connected to one another in fixed fashion by means of suitable fixing means 32, 33, whereby these fixing means 32, 33 are preferably in the form of rivet or welded connections.

The right side housing part 22 forms the housing floor 5, a side wall 2 which is only difficult to deform in comparison, an acceptance area 6 for a gas generator 18 (see FIG. 3), and a right flange area 8. On the left side housing part 23 deformation elements are created on a side wall 3 in a flat surface section 4 basically following on from the housing floor 5 in the form of bridges 11, 12, 13. Cut-outs 14, 15 are present between bridges 11, 12, 13, which provide targeted weakening of the material of this surface section 4 of the side wall 3 of the left side housing part 23.

An upper section 25 of the side wall 3 remains stable when a force, F, affects left flange area 24 of the left side housing part 23, while bridges 11, 12, 13 deform in a targeted manner.

A flanged side section 34 of the side wall 3, as formed with the upper section 25 and the left flange area 24, reaches around the right side housing part 22 and is then connected to the right flange area 8 by means of fixing means 33.

Flange areas 8, 24 serve for fixing to an interior cladding element 10 of the motor vehicle. This can, for example, be a section of an instrument panel, which after assembly of housing 1 with or on the interior cladding element 10 is covered by a thin plastic skin which can tear open when the airbag expands. In this connection, attention is drawn to the fact that in the case that this housing 1 is in the form of an airbag module, or following supply of this housing 1 with the gas generator 18 and a folded airbag (not shown), the housing 1 itself can be preferably supplied with a so-called "soft cover", in other words a thin cover film 29, which protects the housing contents against dirt during transport and prevents the folded airbag from falling apart (see FIG. 3).

FIG. 2 shows housing 1 according to FIG. 1 in a schematic cross-sectional view, whereby the cutting line runs through housing 1 approximately in the area of the two stay bolts 26, 27. As can clearly be seen from this illustration, housing 1 is mainly characterized by the side walls 2, 3 already mentioned, which above all differ from each other in that side wall 2 deforms with relative difficulty and side wall 3 deforms relatively well when a force F affects the top side of housing 1 of the interior cladding element 10 fixed there.

Such a force, F, for example, affects housing 1 if in the case of a so-called low-speed accident the deceleration of the vehicle is not yet great enough to trigger gas generator 18 of the airbag module, but the head of the vehicle occupant strikes the instrument panel in the area of this housing 1, for example because he was not belted in.

As is already known from the state of the art discussed at the beginning, a housing or airbag module of the generic type should be designed in such a way that it yields slightly at the effect of force, F, and therefore converts a part of the impact energy into deformation work.

According to the present invention, housing 1 is now formed in such a way that one side wall 3 can basically be deformed in the direction of housing floor 5 when force, F, is applied, while the form of the opposite side wall 2 remains stable. In addition it is intended that in the case of a pull force mainly pointing away from housing floor 5, the form of side wall 2 and therefore housing 1 remain stable.

The aforementioned deformation behavior is above all achieved by the fact that deformation bridges 11, 12, 13 already mentioned are formed on the side wall 3, which in its normal condition, in other words when no loading is applied, is in the form of basically flat surface section(s) 4. Only when these deformation bridges 11, 12, 13 are affected by a force, F, applied approximately in the direction of the housing floor 5 do they buckle away to the side, so that they take up deformation work. In this connection, attention is drawn to the fact that the deformation bridges 11, 12, 13 exhibit a defined distance 21 to side wall part 17 when in undisturbed condition, which allows space for the distortion process described above.

In so far as a tensile force affects these deformation bridges 11, 12, 13 and which basically acts away from the housing floor 5, in other words in the direction towards interior cladding element 10, these bridges 11, 12, 13 remain in their extended and generally flat initial geometry, so that the geometry of the housing 1 remains completely intact in the presence of such a tensile force.

FIG. 3 shows how the deformation bridge 12 distorts when force, F, acts on flange area 24 in exemplary form in comparison with FIG. 2. In the initial situation according to FIG. 2 where no load is present, deformation bridge 12 is mostly formed flat and in this illustration is pointing vertically upwards. The effect of force, F, leads to deformation bridge 12 kinking in to such an extent that it takes on the cross-sectional geometry of section 12' in accordance with FIG. 3.

During this deformation, the interior cladding element 10 moves according to the swivel arrow 36 as shown in FIG. 2 round a virtual swivel axis on the rotation or bending section 9 on side wall 2 which is stable in form, so that the interior cladding element 10 moves inwards in a targeted fashion and also transforms energy arising from movement into distortion work as desired.

In this design it is of particular advantage that the section 12' which has kinked out does not extend into an interior portion 7 of the housing 1, as the folded airbag is there, not shown on this occasion. This kink behavior is achieved above all by means of the fact that the deformation bridge 12 can support itself with its inner side on side wall part 17, which joins on directly to housing floor 5 and which is an integral part of the less easily deformable side wall 2. The rest of side wall 3 formed by deformation bridges 11, 13 behaves in substantially the same manner.

As is also clearly shown in FIGS. 2 and 3, deformation bridge 12 is firmly fixed to side wall part 17, whereby the relevant joining means 32 can only be seen in FIG. 1.

The targeted kinking away of bridges 11, 12, 13 is achieved by the selection of the bridge geometry, the number of bridges and cut-outs as well as by their material. In addition, it can be provided for that a certain deformation structure 35 is embossed on deformation bridges 11, 12, 13, which allows these bridges to yield in the desired form.

It is considered a basic characteristic of the invention that an injection channel 16 for the airbag is formed in the interior portion 7 of the housing 1. This injection channel 16 is formed at least with regard to one of its side walls by side wall 3 which distorts relatively easily. The upper portion of the housing 1 may form the upper portion of the injection channel 16 and the side section 34 may form the side portion of the injection channel 16. This means that it is possible to form this housing 1 itself as a complete airbag module, including the gas generator 18, the airbag, the soft cover 29 and/or the interior cladding element 10, injection channel 16 and also side wall 3 which is capable of deformation. This leads to considerable cost savings in comparison with comparable devices corresponding to the state of the art, as this complete assembly unit is pre-mounted and can then be joined to the aforementioned vehicle body structure and/or the instrument panel.

In relation to FIG. 3 it should be mentioned that the acceptance area 6 for the gas generator 18 of the airbag module is preferably formed in housing 1. This acceptance area 6 basically consists of a semi-cylindrical section 37 of side wall 2, on whose interior side a housing cover 30 covers the gas generator 18 in relation to the interior portion 7 of the housing 1.

In summary it can be said that the housing 1 for acceptance of the airbag module (not shown) or the airbag module according to the invention display the desired component behavior with regard to the push and pull forces acting on the same. This is achieved by means of a structure which is relatively simple and which can be manufactured at low cost. In addition, the injection channel 16 for an unfolding airbag (not shown) is already advantageously integrated into this airbag module, so that it is not necessary to undertake related measures with regard to other vehicle components.

The invention claimed is:

1. An airbag module of a motor vehicle, the module comprising:
   a housing for retaining an airbag;
   a housing floor for attaching the housing to the motor vehicle;
   a first side wall of the housing having a plurality of deformation bridges separated by a plurality of apertures; and
   a second side wall of the housing having an extended portion at a predetermined distance to the first side wall, the extended portion oriented generally parallel to the first side wall prior to deformation of the first side wall;
   wherein the housing is configured such that application of a deformation force to the first side wall generally in a direction of the housing floor deforms the deformation bridges the predetermined distance to the extended portion of the second side wall for controlled deformation of the first side wall.

2. The airbag module according to claim 1, wherein the first side wall resists deformation in response to a tensile force exerted generally in a direction away from the housing floor.

3. The airbag module according to claim 1, wherein the second side wall integrally defines an acceptance area for a gas generator.

4. The airbag module according to claim 1, wherein the second side wall includes a flange area with a flange section around which an interior cladding element can be swivelled generally in the direction of the housing floor in response to deformation of the first side wall.

5. The airbag module according to claim 1, wherein the first side wall is configured to only yield mechanically when the deformation force exceeds a predetermined force.

6. The airbag module according to claim 1, wherein an injection channel is integrated into the housing for targeted unfolding of an airbag of the airbag module, whose one channel wall is at least partially formed by the first side wall.

7. The airbag module according to claim 1, wherein the second side wall forms at least a part of the housing floor, an acceptance area for the airbag module and a first flange area with a rotation or bend round section, and the first side wall forms a second flange area for fixing of an interior cladding element, and an upper section of an injection channel.

8. The airbag module according to claim 7, wherein the first side wall substantially forms the injection channel.

9. The airbag module according to claim 7, wherein a support element is integrally formed with the housing floor, integrally formed with the second side wall, or is fixed to one of the housing floor and second side wall.

10. The airbag module according to claim 9, wherein the housing is formed as the airbag module, in which a gas generator, an airbag, the deformation bridges, the injection channel for the airbag as well as the first and second flange areas are configured for fixing of the interior cladding element.

11. The airbag module according to claim 1, wherein the housing includes an open side covered by a cover foil.

12. The airbag module according to claim 1, wherein the housing is formed as a passenger airbag module.

13. The airbag module of claim 1, wherein the deformation bridges include integrally formed deformation structures for weakening the mechanical stability of the first side wall.

14. An airbag housing of a motor vehicle comprising:
a floor for attaching the housing to the motor vehicle; and
a side upwardly extending from the floor, the side including a first wall portion and a deformable portion depending from the first wall portion, the deformable portion oriented generally parallel to the first wall portion and normally positioned a distance from the first wall portion, the deformable portion including a plurality of deformation bridges arranged adjacent a plurality of cut-outs, the deformable portion being deformable in response to a deformation force such that continued deformation is opposed by contact with the first wall portion.

15. The airbag housing according to claim 14, wherein the plurality of deformation bridges include deformation elements which weaken the mechanical stability of the deformable portion.

16. The airbag housing according to claim 15, wherein the deformation elements are integrally formed with the plurality of deformation bridges.

17. The airbag housing according to claim 16, wherein the cut-outs are in the form of holes or individual seams.

18. The airbag housing according to claim 14, wherein the first wall portion is integrally formed with the housing floor.

19. The airbag housing according to claim 18, wherein free ends of the deformation bridges are connected with a flange area for fixing an interior cladding element.

20. The airbag housing according to claim 19, wherein the deformation bridges when deformed substantially support themselves on the first wall portion crosswise to the deformation force.

* * * * *